(12) United States Patent
Ullein et al.

(10) Patent No.: US 8,696,501 B2
(45) Date of Patent: Apr. 15, 2014

(54) TENSIONING DEVICE PERTAINING TO A TRACTION MECHANISM DRIVE

(75) Inventors: Thomas Ullein, Frensdorf (DE); Reinhard Koch, Wachenroth (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 330 days.

(21) Appl. No.: 12/685,848

(22) Filed: Jan. 12, 2010

(65) Prior Publication Data

US 2010/0113198 A1 May 6, 2010

Related U.S. Application Data

(62) Division of application No. 11/910,552, filed as application No. PCT/EP2006/002549 on Mar. 21, 2006, now abandoned.

(30) Foreign Application Priority Data

Apr. 28, 2005 (DE) .......................... 10 2005 019 694

(51) Int. Cl.
*F16H 7/08* (2006.01)

(52) U.S. Cl.
USPC ........................................................ 474/111

(58) Field of Classification Search
USPC .................................... 474/109–111; 29/521
See application file for complete search history.

(56) References Cited

U.S. PATENT DOCUMENTS

| | | | | |
|---|---|---|---|---|
| 2,963,918 A | * | 12/1960 | Blakstad | 474/111 |
| 3,407,674 A | * | 10/1968 | Pearce et al. | 474/111 |
| 3,626,776 A | * | 12/1971 | Staudinger et al. | 474/111 |
| 3,710,634 A | * | 1/1973 | Tamaru et al. | 474/111 |
| 3,802,286 A | * | 4/1974 | Winklhofer et al. | 474/111 |
| 3,812,733 A | * | 5/1974 | Yoshida | 474/111 |
| 3,964,331 A | * | 6/1976 | Oldfield | 474/110 |
| 4,472,161 A | | 9/1984 | Ojima | |
| 4,702,726 A | | 10/1987 | Ojima et al. | |
| 4,722,720 A | | 2/1988 | Ojima et al. | |
| 4,747,811 A | | 5/1988 | Sawafuji et al. | |
| 4,832,664 A | * | 5/1989 | Groger et al. | 474/111 |
| 4,838,840 A | | 6/1989 | Mutoh et al. | |
| 5,030,170 A | | 7/1991 | Ojima | |

(Continued)

FOREIGN PATENT DOCUMENTS

| | | |
|---|---|---|
| DE | 4034087 | 5/1991 |
| DE | 4006910 | 9/1991 |
| DE | 0483564 | 5/1992 |

(Continued)

*Primary Examiner* — William A Rivera
*Assistant Examiner* — Henry Liu
(74) *Attorney, Agent, or Firm* — Volpe and Koenig, P.C.

(57) ABSTRACT

A tensioning device for a traction mechanism drive. The tensioning device includes a tensioning piston which is mounted in an axially movable manner and provided with an attachment shaft facing the traction mechanism. The tensioning device also includes a tensioning shoe formed of a polymer plastic and mounted on the attachment shaft via a support hole, and a disk-shaped metallic support element which is fixed to the attachment shaft via its support hole. The force transmission between the tensioning shoe (2) and the tensioning piston (5) is improved by pre-mounting the support element (11) in or on the tensioning shoe (2) in a positively or non-positively fixed manner, and the support element (11) is connected to the tensioning piston (5), in the mounted state, via a press fit between the support hole (12) and the attachment shaft (4), and contacts a shoulder (9) of the tensioning piston (5).

3 Claims, 3 Drawing Sheets

(56) References Cited

U.S. PATENT DOCUMENTS

| | | | |
|---|---|---|---|
| 5,088,966 A * | 2/1992 | Suzuki et al. | 474/111 |
| 5,197,420 A * | 3/1993 | Arnold et al. | 123/90.15 |
| 5,248,282 A * | 9/1993 | Suzuki | 474/110 |
| 5,595,549 A * | 1/1997 | Jarrand | 474/91 |
| 5,601,505 A * | 2/1997 | Tada | 474/110 |
| 5,606,941 A * | 3/1997 | Trzmiel et al. | 123/90.15 |
| 5,628,701 A * | 5/1997 | Dembosky et al. | 474/103 |
| 5,782,625 A | 7/1998 | Young | |
| 5,797,817 A * | 8/1998 | Senftleben et al. | 474/110 |
| 7,473,197 B2 * | 1/2009 | Le et al. | 474/111 |

FOREIGN PATENT DOCUMENTS

| | | |
|---|---|---|
| DE | 4041785 | 6/1992 |
| DE | 4212126 | 10/1992 |
| DE | 4013190 | 5/1994 |
| DE | 19536643 | 4/1997 |
| DE | 19651091 | 12/1997 |
| DE | 69816264 | 5/2004 |
| DE | 10341800 | 4/2005 |

* cited by examiner

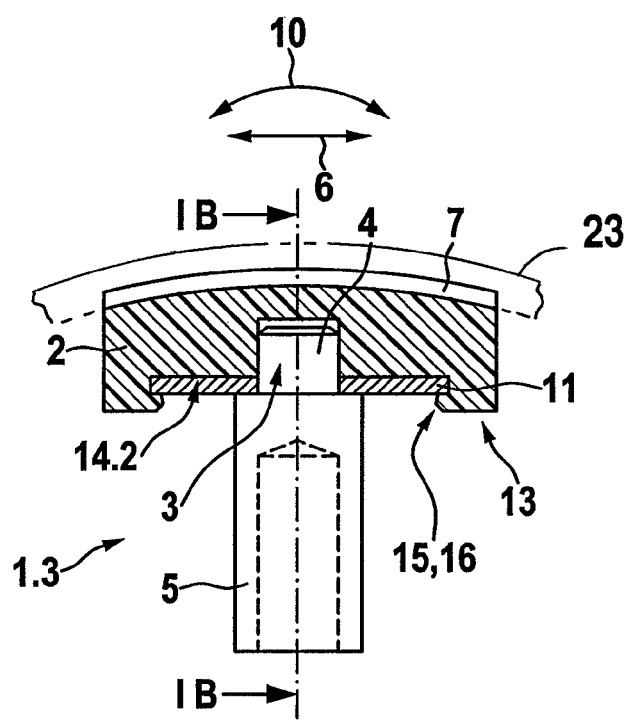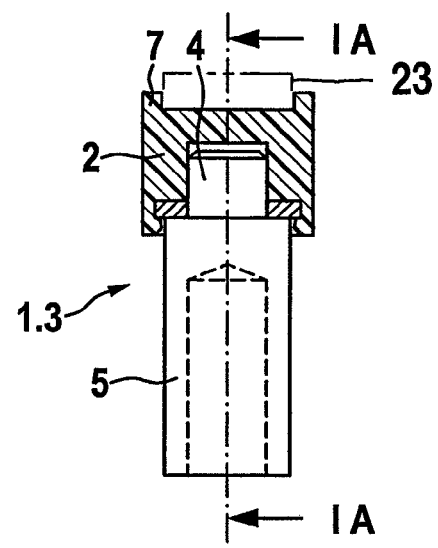

TENSIONING DEVICE PERTAINING TO A TRACTION MECHANISM DRIVE

CROSS-REFERENCE TO RELATED APPLICATIONS

This application is a divisional of U.S. application Ser. No. 11/910,552, filed Oct. 3, 2007, which was a 371 National Phase of PCT/EP2006/002549, filed Mar. 21, 2006, which claimed the benefit of German Patent Application No. DE 10 2005 019 694.2, filed Apr. 28, 2005, all of which are incorporated herein by reference as if fully set forth.

BACKGROUND

The invention relates to a tensioning device of a traction mechanism drive, with a tensioning piston, which is mounted so that it can move in the axial direction and which is provided with an attachment shaft facing the traction mechanism, with a tensioning shoe made from plastic mounted via a support hole on the attachment shaft, and with a disk-shaped metallic support element having a support hole fixed to the attachment shaft.

Traction mechanism drives, such as chain drives and toothed belt drives, are used in many machines for power transfer due to their reliability and cost-effectiveness, e.g., also for driving camshafts in reciprocating internal combustion engines of motor vehicles. Traction mechanism drives frequently have vibration dampers in the form of housing-fixed sliding shoes, which are preferably made from a low-friction polymer plastic or from a guide rail made from metal coated with this material and which are in sliding contact with the traction mechanism, for preventing vibrations of the traction mechanism chain or toothed belt.

The sliding shoes could be arranged both on the tensioned side and also on the loose side of the traction mechanism. For increasing the angle of belt wrap on the driving and driven gears, but especially for compensating for longitudinal expansion of the traction mechanism occurring during operation, traction mechanism drives usually also have a tensioning device arranged on the loose side. This tensioning device has available a tensioning piston, which is mounted so that it can move in the axial direction and which acts on a tensioning shoe loaded by a spring element and/or a compression means. This tensioning shoe deflects the loose side of the traction mechanism normal toward its direction of motion and also toward the rotational axes of the gears and thus compensates for the longitudinal expansion and tensions the traction mechanism.

From DE 40 13 190 C2, a tensioning device for a chain drive is known, in which a tensioning shoe is formed as a separate component and which is mounted so that it can rotate about a housing-fixed shaft. A tensioning piston, which loads the tensioning shoe with a compressive force, is located at a distance from the shaft and thus presses this shoe against the loose side of the chain, whereby this is tensioned. Due to the slide-shifting contact of the tensioning shoe with the tensioning piston, rotation due to operation is largely prevented between the tensioning piston and the tensioning shoe. A disadvantage in this known tensioning device, however, is the large number of components and the relatively large spatial requirements.

In DE 195 36 643 A1, a tensioning device for a chain drive is described, in which two tensioning shoes made from a polymer plastic and aligned opposite one another are fixed rigidly to a tensioning lever, which is formed as a rocking lever and which is mounted between the two tensioning shoes so that it can rotate about a housing-fixed shaft. A tensioning piston loads the tensioning lever at a distance from the shaft with a compressive force and thus presses both tensioning shoes in opposite directions against the loose side of the chain, whereby this is tensioned. Due to the rotating support of the tensioning lever and the sliding contact of the tensioning lever with the tensioning piston, no large rotation occurs between the tensioning shoes and the tensioning lever. The number of components and the spatial requirements, however, are increased disadvantageously relative to the construction named above.

For use especially under narrow spatial relationships, compact tensioning devices have been developed, in which the tensioning shoe is connected essentially rigidly to the tensioning piston.

A first tensioning device constructed in this way is known as a component of a camshaft chain drive from DE 40 06 910 C1, in which a tensioning shoe is arranged, with less projection of the tensioning piston and thus unfavorably smaller contact surface to the chain, directly on the attachment shaft of the tensioning piston.

Another such tensioning device is described in DE 698 16 264 T2, in particular, for use in a chain drive of a camshaft drive, in which the tensioning shoe has a clear projection relative to the tensioning piston and is shifted laterally onto a disk-shaped support element fixed rigidly on the tensioning piston on the outside and is also secured with a screw connection. In this construction, the high expense for the production and the assembly of the individual parts is disadvantageous.

In addition, a tensioning device that can be produced simply and economically is known, in which a tensioning shoe with large projection of the tensioning piston is produced from a polymer plastic, provided with a central support hole, and connected to this rigidly by insertion on a cylindrical support shaft of the tensioning piston. In this construction, however, especially due to the large projection, usually fluctuating bending loads occurring in operation between the tensioning shoe and the tensioning piston can lead to tensioning excesses in the area of the support hole of the tensioning shoe, which can lead to overloading and possibly even to the destruction of the tensioning shoe.

For better load distribution and transfer of bending forces from the tensioning shoe into the tensioning piston, a disk-shaped metallic transfer element with a central support hole in front of the tensioning shoe is pressed onto the support shaft and fused or welded with this. In this way, the force transfer between the tensioning shoe and the tensioning piston is definitely improved, but disadvantageously the production process becomes more complicated. In addition, the fusing or welding of the support element with the tensioning piston can lead to undesired deformation and twisting in both components.

SUMMARY

Therefore, the invention is based on the objective of providing a tensioning device of a traction mechanism drive of the type noted above, which produces a more stable connection of the tensioning shoe with the tensioning piston for a simple and economical setup, especially for the use of a tensioning shoe projecting over the tensioning piston.

The invention is based on the knowledge that through a large-area introduction of load forces and bending moments from the tensioning shoe made from a polymer plastic into the metallic support element and through forwarding of the bending moment into the tensioning piston essentially via the support element, smaller peak loads appear in the tensioning shoe and thus a more stable unit made from the tensioning piston, support element, and tensioning shoe is formed without complicated measures.

Consequently, the stated objective is met by a tensioning device in which the support element is pre-mounted in or on the tensioning shoe in a non-positive and/or positive fit connection and that the support element is connected in the mounted state to the tensioning piston by a press fit between its support hole and the attachment shaft, and also contacts a shoulder of the tensioning piston.

Therefore, because the tensioning shoe is connected to the disk-shaped support element with a non-positive and/or positive fit and the support element is pressed onto the attachment shaft of the tensioning piston and contacts the shoulder, loads occurring during operation are distributed between the tensioning shoe and the support element each over a relatively large area, so that local tensioning peaks and overloading the polymer plastic of the tensioning shoe, especially in the region of the support hole of the tensioning shoe, are prevented. The generated load forces can be transmitted through the press fit in connection with the large-area contact on the shoulder between the support element and the tensioning piston.

Thus, the operation-dependent loads are introduced from the tensioning shoe into the tensioning piston essentially via the press fit of the support hole of the support element with the attachment shaft of the tensioning piston, and only to a smaller extent via the contact of the support hole of the tensioning shoe with the attachment shaft, which can be formed as a clearance fit or also as a loose press fit. By pre-mounting the tensioning shoe and the support element, both components are pressed onto the attachment shaft of the tensioning piston in a common processing step. The components are easily set up and thus can be produced economically. The assembly of the components is also simple and can be performed quickly.

Advantageous constructions of this tensioning device according to the invention are described below.

For connecting the tensioning shoe to the support element, the support element is preferably extrusion coated with the polymer plastic of the tensioning shoe, which produces an optimum contact between the tensioning shoe and the support element and which also can be produced easily and economically.

In contrast, in an alternative and similarly economical embodiment of the invention, the tensioning shoe has an under-dimensioned recess, which is adapted to the support element and in which the support element is pressed, on the side facing the tensioning piston.

In another preferred embodiment, the tensioning shoe on the side facing the tensioning piston has an over-dimensioned recess adapted to the support element with at least two projecting locking tabs, which are arranged on opposing edges of the recess and in which the supported element is pressed and locked.

Similarly, it is also possible that the tensioning shoe is provided with a slot, which is open on one side and which is aligned parallel to the side facing the tensioning piston and which is adapted to the support element and in which the support element is pushed and fixed through the placement of the tensioning shoe onto the support shaft of the tensioning piston.

For preventing rotation of the tensioning shoe relative to the tensioning piston, the attachment shaft of the tensioning piston and the support hole of the support element preferable each have a correspondingly shaped element for mutual directional fixing. The shaped element of the tensioning piston can be most easily formed as a one-sided flattened section of the circular cross section of the attachment shaft, which can be produced through milling, and the shaped element of the support element can be formed as a corresponding, one-sided flattened section of the circular support hole in the form of a secant, which can be produced through stamping with corresponding die plates.

For reinforcing the locking on the support shaft of the tensioning piston, the support hole of the support element can also preferably have a narrow section, which can be formed, for example, by an inward deviation from the circular hole edge. In this respect, a formation of the support hole of the support element in the form of a construction of the hole edge as a polygonal secant course, e.g., as a polygonal hexagon course, for which suitable stamping tools are economically available. The reinforcement of the locking of the support element on the support shaft is here caused by a partial plastic deformation of the hole edge of the support element in the region of the throat.

BRIEF DESCRIPTION OF THE DRAWINGS

The invention is explained in more detail below using examples with reference to the enclosed drawing. Shown are FIG. 1a a first embodiment of a tensioning device according to the invention in a lateral section IA-IA, FIG. 1b the tensioning device according to FIG. 1a in a cross section IB-IB, FIG. 2a a first embodiment of a known tensioning device in a lateral section IIA-IIA, FIG. 2b the known tensioning device according to FIG. 2a in a cross section IIB-IIB, FIG. 3a a second embodiment of a known tensioning device in a lateral section IIIA-IIIA, FIG. 3b the known tensioning device according to FIG. 3a in a cross section IIIB-IIIB, FIG. 4a a first refinement of the tensioning device according to the invention in a top view of the support element, FIG. 4b the first refinement according to FIG. 4a in a top view of the tensioning piston, FIG. 5a a second refinement of the tensioning device according to the invention in a top view of the support element, and FIG. 5b the second refinement according to FIG. 5a in a top view of the tensioning piston.

DETAILED DESCRIPTION OF THE PREFERRED EMBODIMENTS

Before the actual examples of tensioning devices constructed according to the invention are discussed, two known tensioning device according to the class shall be described more precisely with the help of FIGS. 2a to 3b.

Figure 2A:
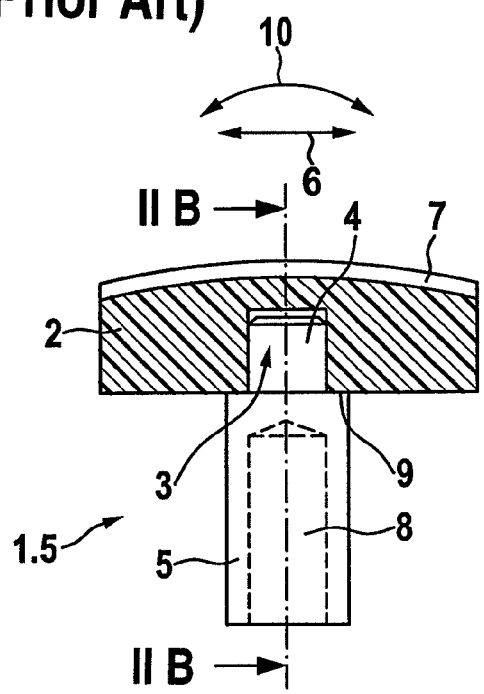
Figure 2B:
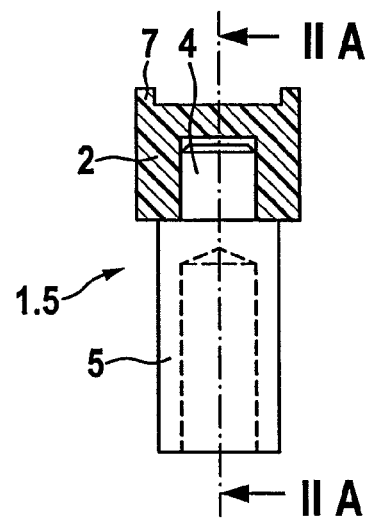

In a first embodiment of a known tensioning device 1.5 according to FIGS. 2a and 2b, a tensioning shoe 2 made from a polymer plastic is pressed with a central support hole 3 directly onto the cylindrical attachment shaft 4 of a tensioning piston 5. The tensioning shoe 2 projects over the tensioning piston 5 in the direction of motion 6 of the not-shown traction mechanism and each has a guide crossbar 7 for lateral guiding of the traction mechanism. Due to the smaller diameter of the attachment shaft 4 relative to the main part 8 of the tensioning piston 5, a shoulder 9 is formed, which is used as a stop for the tensioning shoe 2. Due to bending moments 10 caused by operation, an unfavorably high loading of the tensioning shoe 2 occurs in the region of the support hole 3, which can lead to loosening of the connection between the tensioning shoe 2 and the tensioning piston 5 and also possibly to the destruction of the tensioning shoe 2.

Figure 3A:
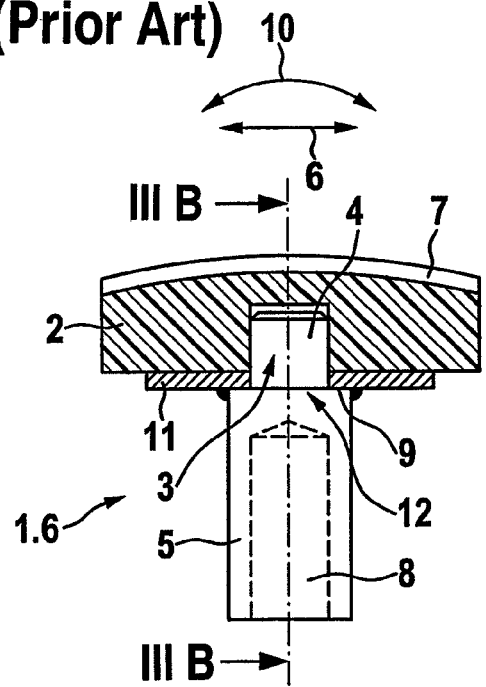
Figure 3B:
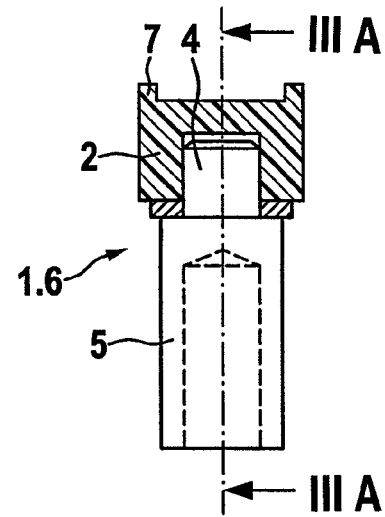

In a second embodiment of a known tensioning device 1.6 according to FIGS. 3a and 3b, for an essentially identical setup as before, initially a disk-shaped support element 11 made from steel with a central support hole 12 is pushed up to the shoulder 9 on the attachment shaft 4 of the tensioning piston 5 and welded with the main part 8 of the tensioning piston 5. Then the tensioning shoe 2 is pressed with its central support hole 3 up to contact with the support element 11 on the attachment shaft 4 of the tensioning piston 5. The force transmission from the tensioning shoe 2 into the tensioning piston 5 is improved by the support element 11. In particular, generated bending moments 10 are absorbed by the support element 11 and introduced into the tensioning piston 5, so that the load in the support hole 3 of the tensioning shoe 2 becomes significantly less. A disadvantage, however, is the increased processing expense for the mounting of the components and possible deformation and twisting of the support element 11 and the tensioning piston 5 caused by the welding.

In a first embodiment of the tensioning device 1.3 according to the invention from FIGS. 1a and 1b, the tensioning shoe 2 faces a traction drive element 23, shown schematically. The tensioning shoe 2 on the inside 13 facing the tensioning piston 5 has an over-dimensioned recess 14.2, which is adapted to the support element 11 and which is provided with at least two projecting locking tabs 16 arranged on opposing edges 15 of the recess 14.2. The support element 11 is pressed into the recess 14.2 and locked behind the locking tabs 16. The unit formed by the pre-mounting of the support element 11 in the tensioning shoe 2 is installed by pressing until the support element 11 contacts the shoulder 9 on the attachment shaft 4 of the tensioning piston 5, wherein the pairing of the support hole 12 of the support element 11 forms, in turn, a fixed press fit with the attachment shaft 4 of the tensioning piston 5. Therefore, for this construction the force transmission from the tensioning shoe 2 into the tensioning piston 5 is also optimal with a simple and economical setup.

Figure 4A:
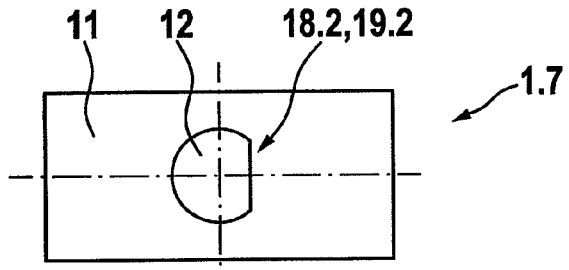
Figure 4B:
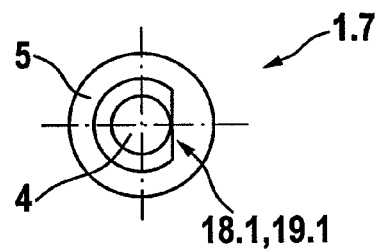

In a first refinement of the tensioning device 1.7 according to the invention from the FIGS. 4a and 4b, the attachment shaft 4 of the tensioning piston 5 and the support hole 12 of the support element 11 each have shaped elements 18.1 and 18.2, respectively, corresponding geometrically to each other for mutual directional fixing. The shaped element 18.1 of the tensioning piston 5 is formed as a one-sided flattened section 19.1 of the circular cross section of the attachment shaft 4 and the shaped element 18.2 of the support element 11 is formed as a corresponding one-sided flattened section 19.2 of the circular support hole 12 in the form of a secant.

Figure 5A:
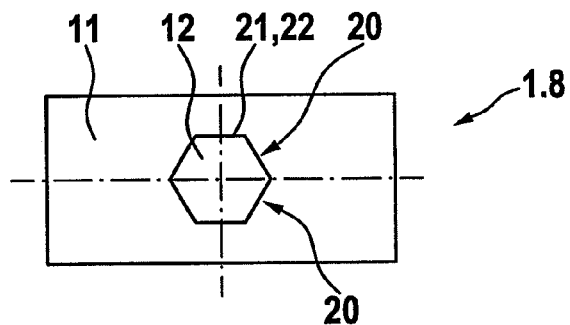
Figure 5B:
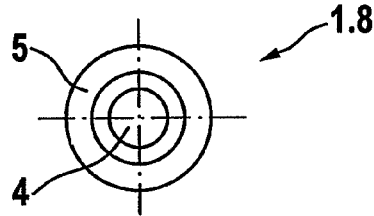

In a second refinement of the tensioning device 1.8 according to the invention from the FIGS. 5a and 5b, the support hole 12 of the support element 11 has throat sections 20, which are formed in the present case by a formation of the hole edge 21 of the support hole 12 in the form of a hexagon polygonal secant course 22. The partial plastic deformation of the hole edge 21 caused in this way during the pressing of the unit formed from the tensioning shoe 2 and the support element 11 on the attachment shaft 4 of the tensioning piston 5, a reinforcement of the locking of the support element 11 on the support shaft 4 is produced. Therefore, the connection of the tensioning shoe 2, support element 11, and tensioning piston 5 can be loaded overall in a more stable and stronger way.

List of Reference Symbols
1.3 Tensioning device
1.5 Tensioning device (state of the art)
1.6 Tensioning device (state of the art)
1.7 Tensioning device
1.8 Tensioning device
2 Tensioning shoe
3 Support hole
4 Attachment shaft
5 Tensioning piston
6 Direction of motion
7 Guiding crossbar
8 Main part
9 Shoulder
10 Bending moment
11 Support element
12 Support hole
13 Inside
14.2 Recess
15 Edge
16 Locking tab
17 Slot
18.1 Shaped element
18.2 Shaped element
19.1 Flattened section
19.2 Flattened section
20 Throat
21 Hole edge
22 Polygonal secant course
23 Traction Drive Element

The invention claimed is:

1. A tensioning device for a traction mechanism drive, comprising a tensioning piston, which is supported so that it can move in an axial direction and which is provided with an attachment shaft facing a traction drive element, a tensioning shoe mounted with a support hole thereof on the attachment shaft and which is made from polymer plastic, and a flat metallic support element having outer edges, fixed with a support hole thereof on the attachment shaft, the support element is pre-mounted with a non-positive or positive-fit connection in or on the tensioning shoe and in a mounted state, the support element is connected to the tensioning piston via a fit between the support element support hole and the attachment shaft, and contacts a shoulder of the tensioning piston with a portion of the attachment shaft extending into the tensioning shoe support hole past the support element in the axial direction, the tensioning shoe has on a side facing the tensioning piston an over-dimensioned recess adapted to a size of the support element with at least two pairs of projecting locking tabs that are arranged on opposing edges of the recess into which the support element is pressed in an axial direction of the attachment shaft and locked with one of the projecting locking tabs engaging over each outer edge of the support element, and the support hole of the support element has a throat section for reinforcing a locking on the attachment shaft of the tensioning piston.

2. The tensioning device according to claim 1, wherein the throat section of the support hole of the support element is formed by an inward deviation from a circular hole edge.

3. The tensioning device according to claim 1, wherein the throat section of the support hole of the support element is formed by a construction of the support hole as a polygonal secant course.

* * * * *